Figure 6:
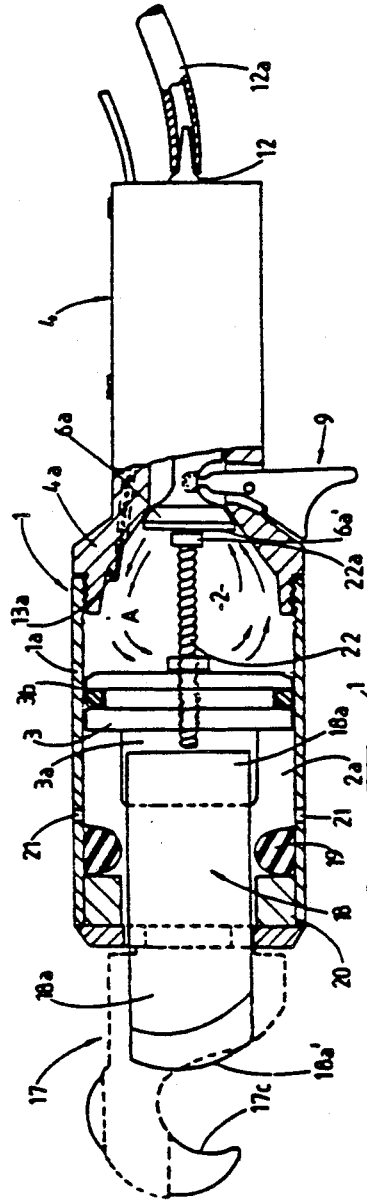

United States Patent [19]

Veldman

[11] Patent Number: 4,905,634

[45] Date of Patent: Mar. 6, 1990

[54] PORTABLE POWER TOOL WITH IMPROVED COMBUSTION CHAMBER CHARGING MEANS

[76] Inventor: Alphonsus G. Veldman, Heatherlea West Road, R.D. 5, Levin, New Zealand

[21] Appl. No.: 301,545

[22] Filed: Jan. 26, 1989

Related U.S. Application Data

[63] Continuation of Ser. No. 111,647, Oct. 23, 1987, Pat. No. 4,821,683, which is a continuation of Ser. No. 922,763, Oct. 24, 1986, abandoned, which is a continuation of Ser. No. 601,400, Apr. 17, 1984, abandoned.

[30] Foreign Application Priority Data

Apr. 18, 1983 [NZ] New Zealand .................. 203923
Apr. 18, 1983 [NZ] New Zealand .................. 203924

[51] Int. Cl.⁴ .................. F02B 71/00; F02D 31/10
[52] U.S. Cl. .................. 123/46 SC; 227/10
[58] Field of Search ............. 123/46 SC, 79 R, 46 H, 123/65 VD, 46 R; 277/9, 10

[56] References Cited

U.S. PATENT DOCUMENTS

| | | | |
|---|---|---|---|
| 2,898,893 | 8/1959 | Rohrer et al. | 227/10 |
| 3,042,008 | 7/1962 | Liesse | 227/10 |
| 3,381,672 | 5/1968 | Tobias et al. | 123/46 SC |
| 3,850,359 | 11/1974 | Obergfell | 227/10 |
| 3,945,551 | 3/1976 | Sato et al. | 227/136 |
| 3,967,771 | 7/1976 | Smith | 227/10 |
| 4,075,850 | 2/1978 | Nakazato et al. | 227/10 |
| 4,200,213 | 4/1980 | Liesse | 123/46 SC |
| 4,405,072 | 9/1983 | Kindle et al. | 227/10 |
| 4,415,110 | 11/1983 | Hunter | 227/10 |
| 4,483,280 | 11/1984 | Nikolich | 123/46 SC |
| 4,483,473 | 11/1984 | Wagdy | 227/10 |
| 4,665,868 | 5/1987 | Adams | 123/46 SC |
| 4,739,915 | 4/1988 | Cotta | 123/46 SC |

Primary Examiner—David A. Okonsky
Attorney, Agent, or Firm—Stevens, Davis, Miller & Mosher

[57] ABSTRACT

A portable power tool comprising a housing defining a combustion chamber and a cylindrical chamber having a reciprocating piston therein. The combustion chamber has an opening defined by a valve seat closable by a poppet valve and serving as an inlet at one side for unburnt gases or vaporized fuel admitted under pressure and an output at an opposite side for spent gases. An ignition assembly is provided for igniting unburnt fuel in the combustion chamber which is synchronized with the closure of the poppet valve. The combustion chamber and the poppet valve are shaped and arranged such that unburnt fuel admitted through one side of the valve seat opening will sweep the spent fuel of a preceding ignition cycle from the combustion chamber out through the other side of the valve seat opening.

21 Claims, 10 Drawing Sheets

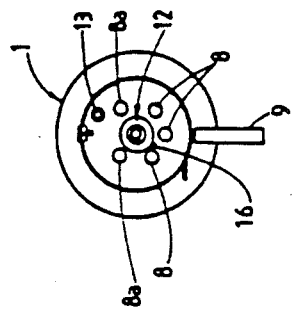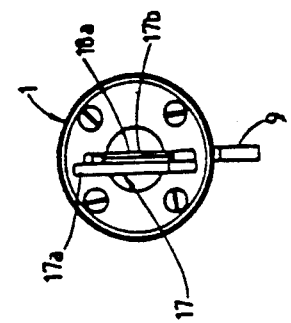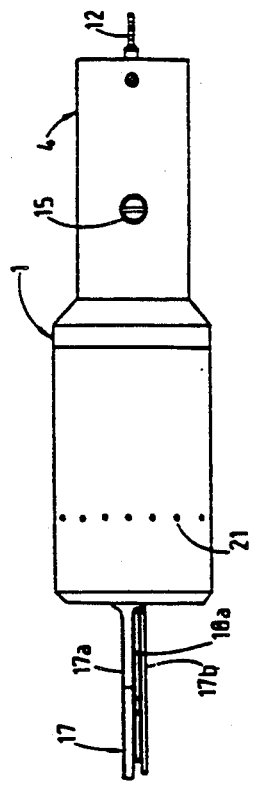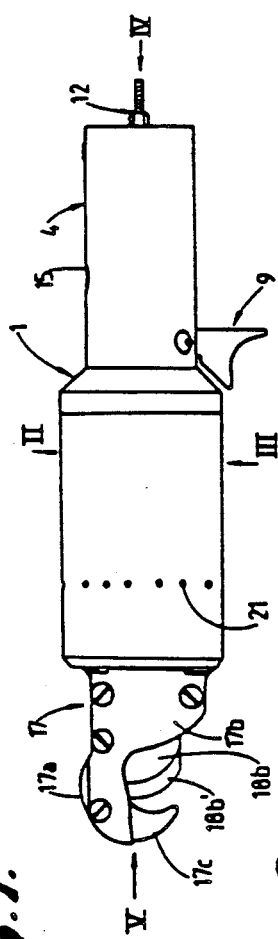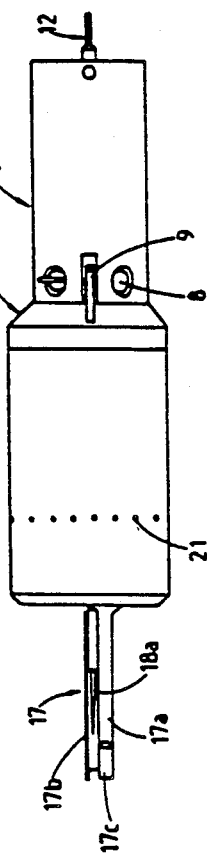

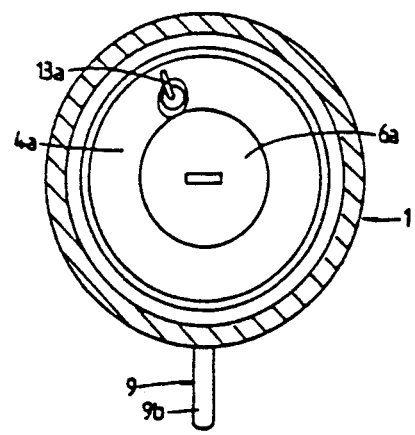
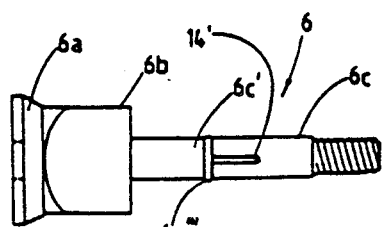
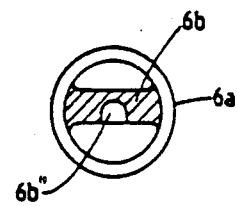
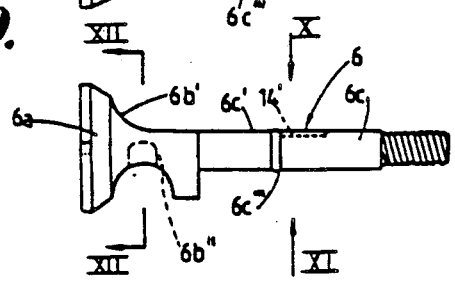
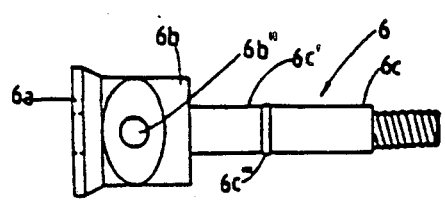

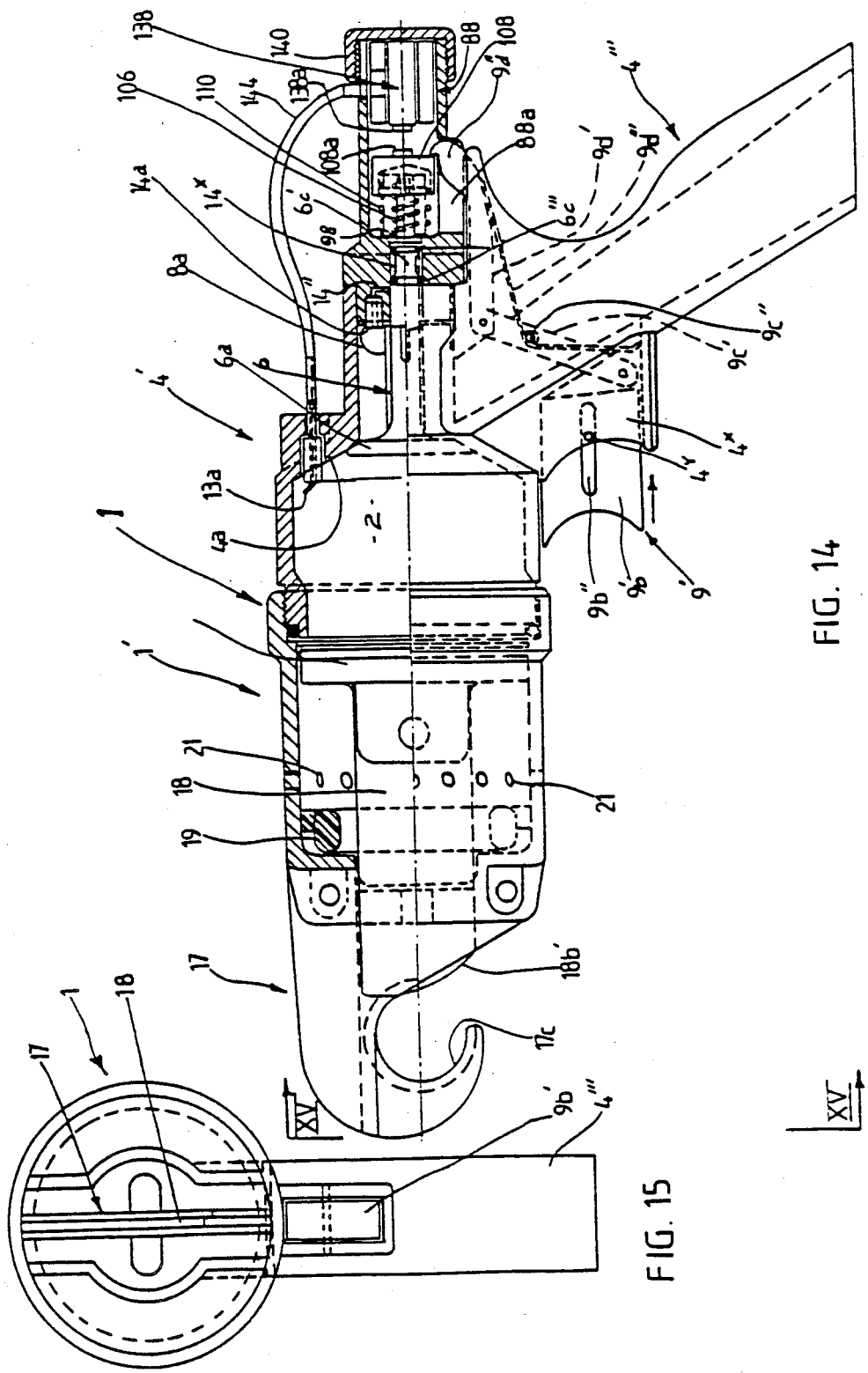

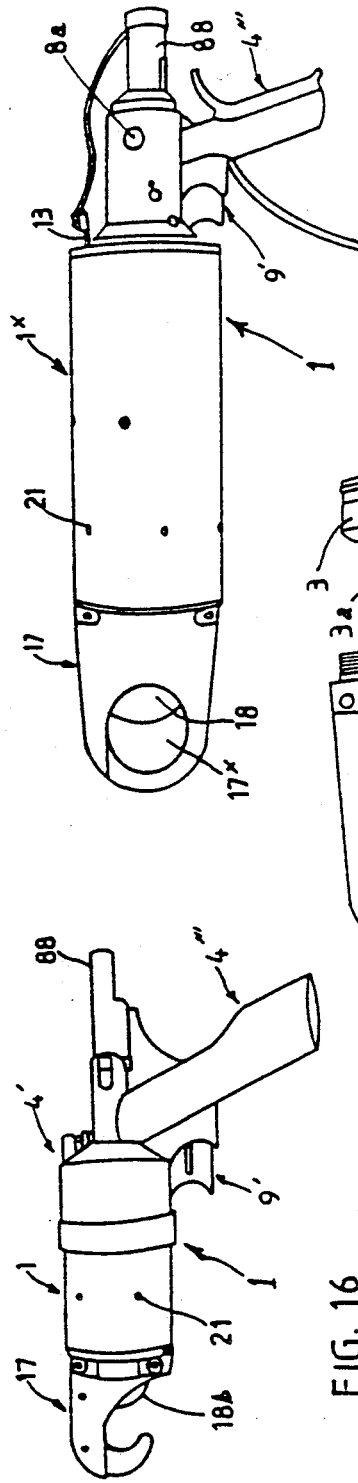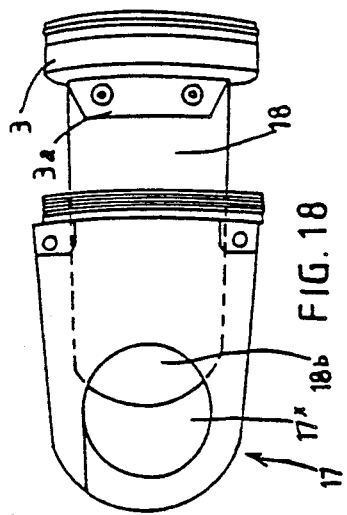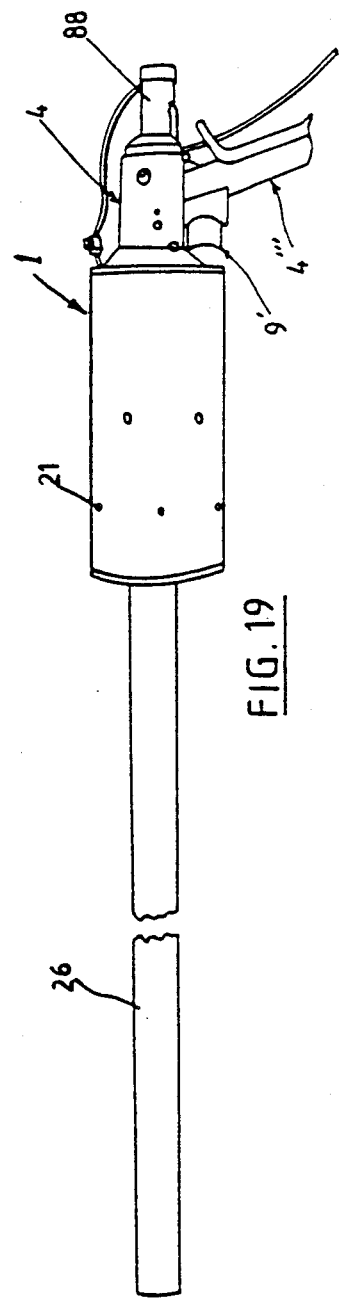

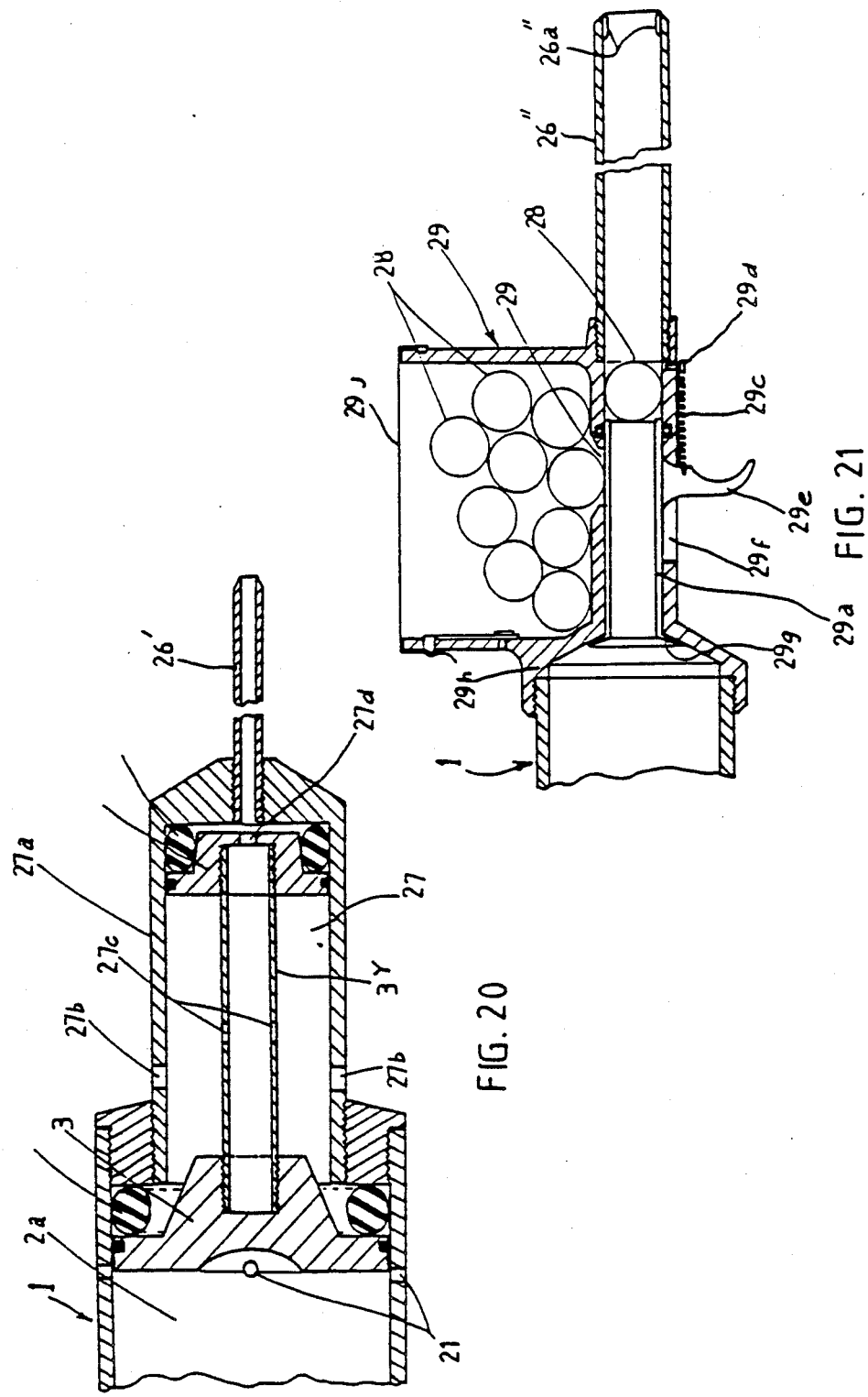

PORTABLE POWER TOOL WITH IMPROVED COMBUSTION CHAMBER CHARGING MEANS

This is a continuation of application Ser. No. 111,647 filed Oct. 23, 1987, now U.S. Pat. No. 4,821,683, which in turn is a continuation of application Ser. No. 06/922,763 filed Oct. 24, 1986, now abandoned, which in turn is a continuation of application Ser. No. 06/601,400 filed Apr. 17, 1984, now abandoned.

This invention relates to percussion cutting and other power tools, and is more particularly concerned with portable or hand held tools, apparatus and devices which require to be readily manipulated and may be usable for cutting operations such as in the pruning of trees, bushes or vines and the like; or may be usable for impact/drive operations such as in power nailing, stapling, riveting, animal ear tagging, and the like. It is to be appreciated that the invention is not solely confined to these operations, but may also have other applications as will be evident from the following description and related drawings.

An object of this invention is to provide a portable power operated tool, device or apparatus (embraced by the term "tool") which is easily manipulated by a user and is arranged for effective rapid and repetitive operations.

Another object of the invention is to provide a portable power tool employing constructions and operations enabling such tool to be readily adapted for a large variety of applications in various fields.

There have been many proposals for driving the work piston of a portable power tool in a working power stroke, and these have included igniting a charge of combustible gaseous or vaporised fuel in a combustion chamber and communicating the combusted gas with the work piston. Despite the many proposals in this field, there has been no significant acceptance of tools of this type in the marketplace and conventionally percussion and cutting power tools of the kind referred to utilise pneumatic compressors, hydraulic systems and explosive cartridges; pneumatic and hydraulic tools generally require expensive and cumbersome back-up equipment and are not truly readily portable tools, and explosive cartridge actuated tools are expensive to operate. Perhaps some reasons for non-acceptance in the marketplace of the various previously proposed combustible fuel actuated piston type tools has been their frequently complex nature resulting in tools expensive to manufacture and subject to problems in operation and servicing, and in efficiency in operation.

The complexity of the tools of the patented literature seems to be inherent in the necessary to establish a proper combustible mixture in the combustion chamber during each operating cycle. A major problem is how to deal with the residual gases in the combustion chamber. At least two tools of the patented literature, namely U.S. Pat. Nos. 2,898,893 and 4,200,213 provide for the combustion chamber by initially moving the working piston within its chamber from a no-volume position into a firing position during which the combustible charge is sucked into the enlarging volume above the piston. Thereafter the charge is ignited to drive the piston through its working stroke.

A recent U.S. Pat. No. 4,403,722 proposes to build into the combustion chamber a fan which is continuously operated. Consequently, after the working stroke has been accomplished and the combustion chamber can be vented to atmosphere, the fan serves to blow out the residual gases.

A number of the tools proposed in the patented literature simply make no effort to purge the residual gases. Instead, the residual gases are left in the combustion chamber and it becomes necessary to introduce the new charge into the residual gases under pressure so that there is enough combustible mixture in the total mixture to achieve ignition and burning. See, for example, 3,042,008; 3,329,003; 3,381,671; 3,850,359; 3,967,771; 4,415,110, 4,075,850, and 4,405,072.

Accordingly, there still is a need for a portable power tool of the type described which effectively purges the residual gases in a more simple fashion so as to enable the tool to be less complex and hence less expensive; and thus further objects of the present invention are to overcome the aforementioned disadvantages and provide an efficient and effective tool of relatively simple construction and capable inexpensive operation.

Other and more particular objects and advantages of the present invention will become apparent from the ensuing description.

According to this invention therefore, there is provided a portable power tool comprising a body defining a cylindrical bore slidably and sealingly housing a reciprocal piston for a movement in one direction from a first position through a power stroke into a second position and in an opposite direction through a return stroke, said body further defining a combustion chamber associated with and arranged for communication with said cylindrical bore at the end remote from the second position of the piston, said combustion chamber being arranged to receive a gaseous or vaporised fuel mixture for ignition and combustion, inlet/outlet opening means provided in said body and communicating with said combustion chamber for the admission of fuel to the combustion chamber and emission of residual gases therefrom, and valve means mounted within said body for movement between an open condition and a closed condition relative to said inlet/outlet opening means; said valve means and inlet/outlet opening means and said combustion chamber being shaped and arranged such that with the valve means in the open condition and the piston at its first position, gaseous or vaporised fuel under pressure is directed into and around the combustion chamber in a manner scouring the combustion chamber of residual gases from the preceding cycle of operation of the tool and sweeping said residual gases out through the inlet/outlet opening means prior to movement of the valve means to its closed condition, there being ignition means actuable to ignite the fuel charge in the combustion chamber with the valve means in the closed condition so that subsequent combustion thereof creates an elevated pressure condition within said combustion chamber and such elevated pressure can be passed to the cylindrical bore and piston therein to cause rapid movement under power of the piston, through its drive stroke towards the second position, said piston being arranged to effect a required power assisted operation.

Figure 7:
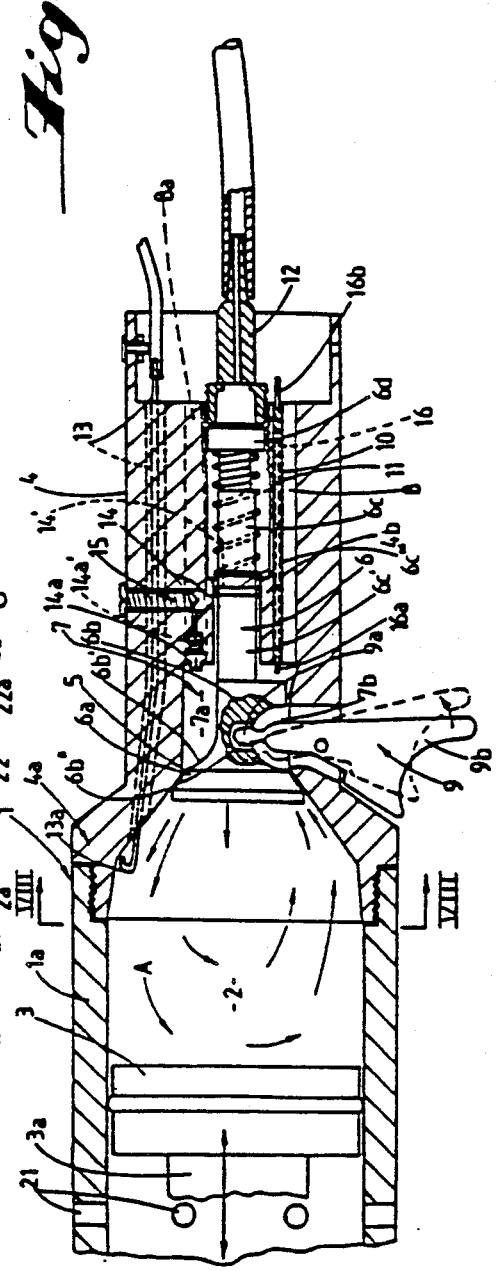
Figure 13:
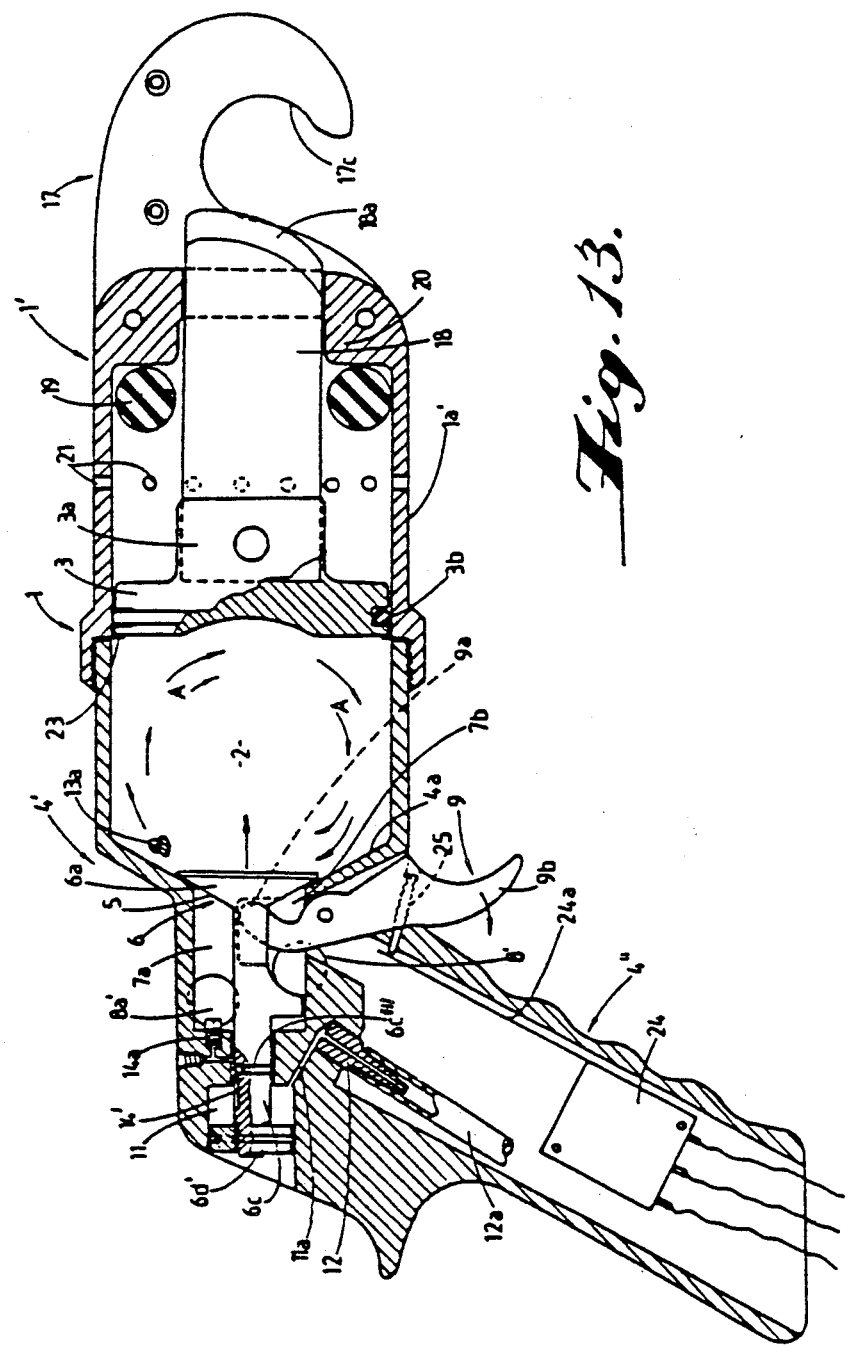
Figure 23:
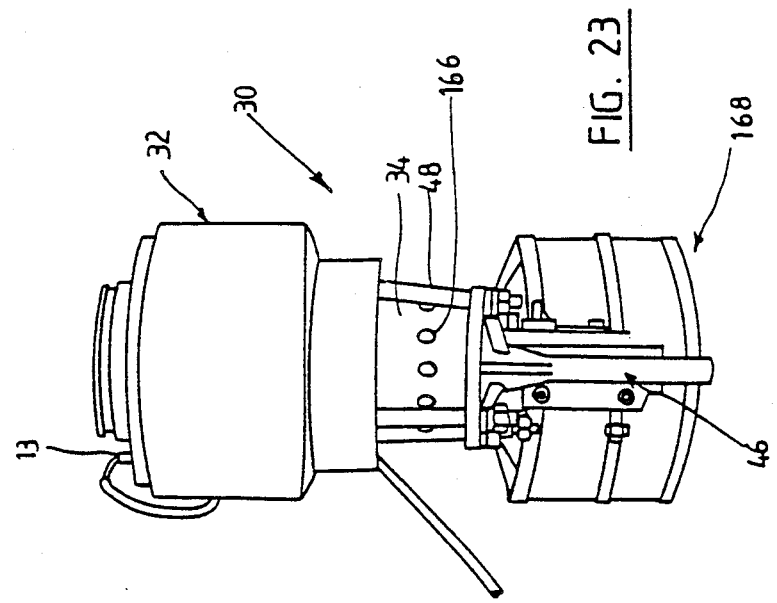
Figure 22:
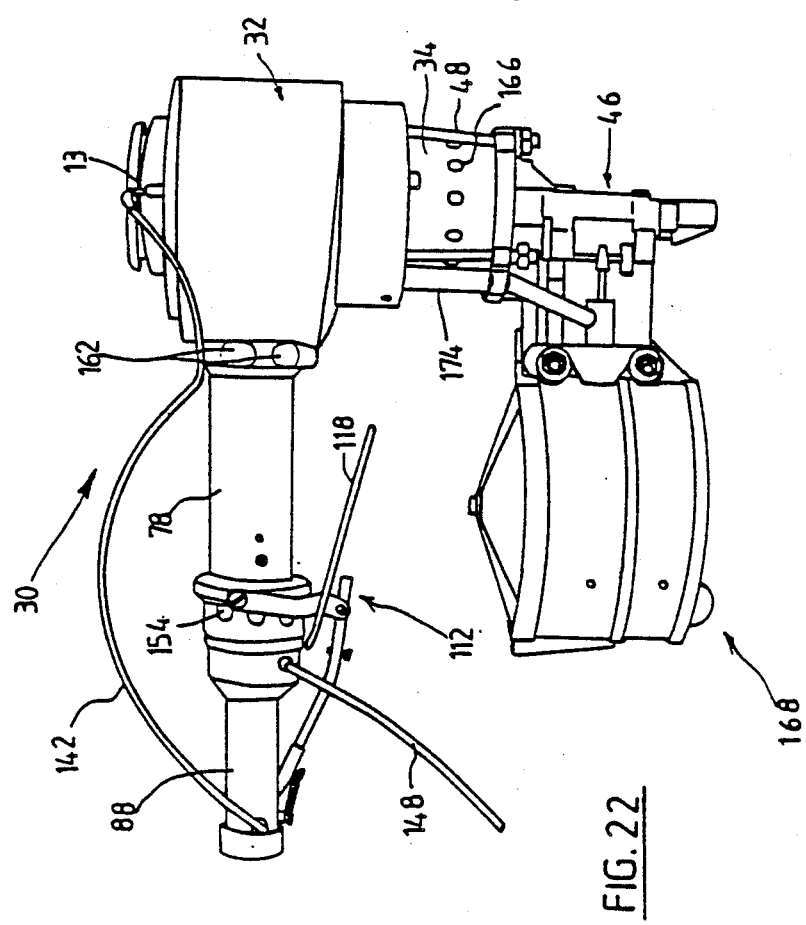
Figure 24:
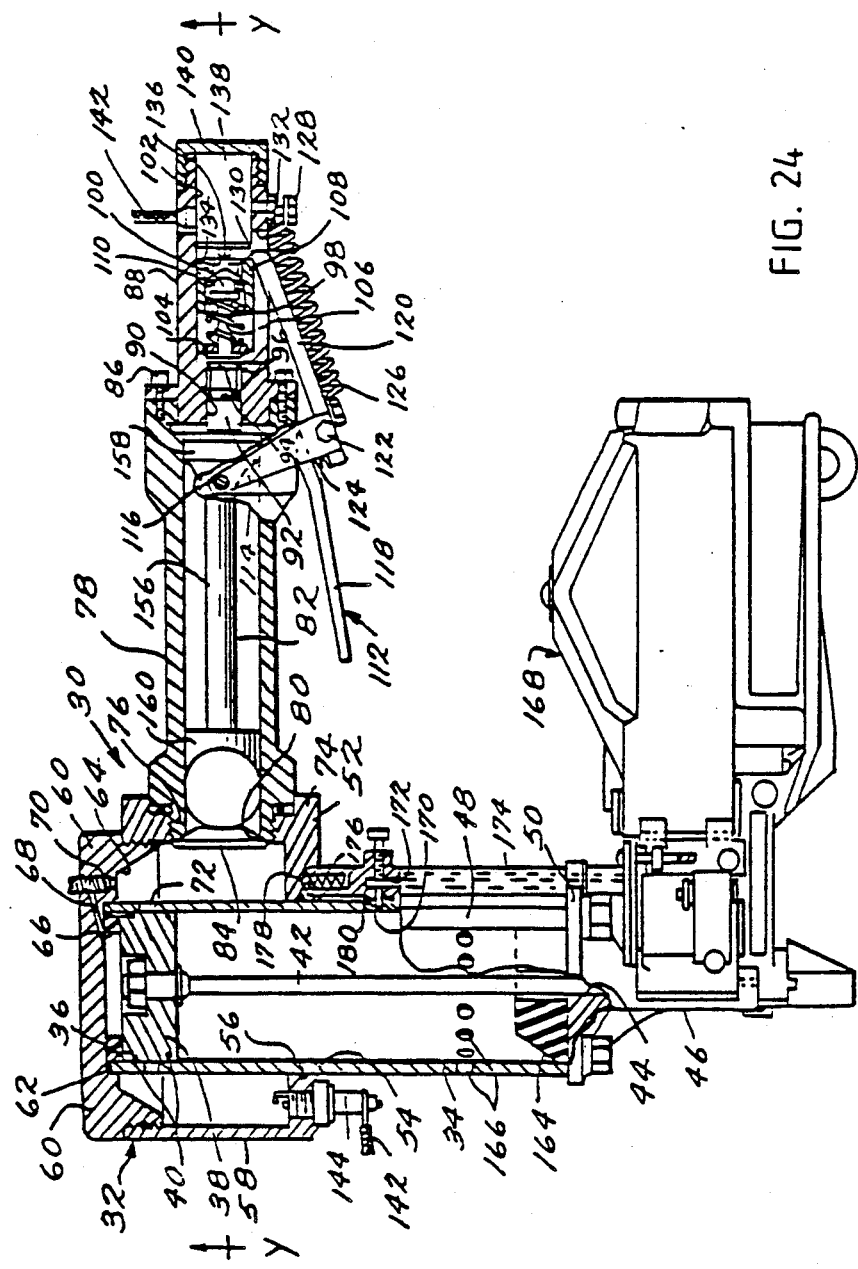
Figure 25:
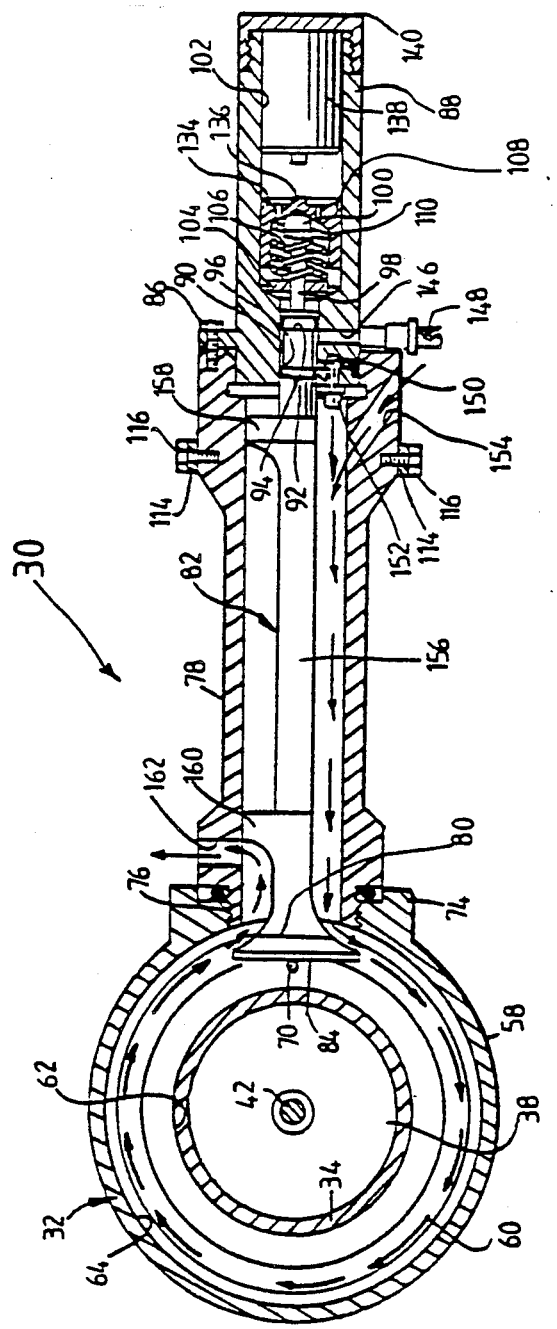

Some preferred aspects of the invention will now be described by way of example and with reference to the accompanying drawings, in which:

FIG. 1 is a side elevational view of a first form of a cutting or pruning tool in accordance with the invention, FIG. 2 is a view in the direction of arrow II of FIG. 1, FIG. 3 is a view in the direction of arrow III of FIG. 1, FIG. 4 is a rear end view in the direction of arrow IV of the tool of FIG. 1, FIG. 5 is an end view in the direction of arrow V of the operative forward end of the tool of FIG. 1, FIG. 6 is an enlarged and part broken side view of the tool of FIGS. 1 to 5, FIG. 7 is a further enlargement and longitudinally sectioned view of the rear end part of the tool of FIGS. 1 to 6, FIG. 8 is a sectional view in the direction of arrows VIII—VIII of FIG. 7, FIG. 9 is a side view of the poppet valve removed from the tool of FIGS. 5 to 8, FIG. 10 is a view in the direction of arrow X of the valve of FIG. 9, FIG. 11 is a view in the direction of arrow XI of the valve of FIG. 9, FIG. 12 is a sectional view in the direction of arrows XII—XII of FIG. 9, FIG. 13 is a longitudinally sectioned view illustrating a second form of cutting or pruning tool in accordance with the invention, FIG. 14 is a part longitudinally sectioned view illustrating a third form of cutting or pruning tool in accordance with the invention, FIG. 15 is a view in the direction of arrow 15 of the operative forward end of the tool shown in FIG. 14, FIG. 16 is a perspective side view of the tool of FIGS. 14 and 15, FIG. 17 is a perspective side view of further form of cutting tool in accordance with the invention and more particularly intended as a tool for the de-horning of horned animals, FIG. 18 is a perspective side view more particularly illustrating the operative cutting end parts and working piston of the tool of FIG. 17, FIG. 19 is a view similar to FIG. 17 but illustrating a further modification and adaption of the tool for firing a projectile, FIG. 20 is a fragmentary longitudinal sectioned view illustrating another modification and adaption of the invention for firing a charge of fluid, FIG. 21 is a fragmentary longitudinal sectioned view illustrating a still further modification and adaption of the invention for the firing of capsules, FIGS. 22 and 23 are side and end perspective views illustrating yet another modification and adaption of the invention for use as a fastener driver e.g. a nailing gun, FIG. 24 is a part longitudinally sectioned side view of a fastener driver similar to that shown in FIGS. 22 and 23, and FIG. 25 is a part longitudinally sectioned view in the direction of arrows y-y of FIG. 24, but showing the poppet valve assembly thereof moved into its open position.

Referring now more particularly to FIGS. 1 to 6 of the drawings, there is shown therein an apparatus which embodies the principles of the present invention. The apparatus is preferably generally arranged in the form of a hand gun for one or two handed operation (preferably one handed operation) and therefore includes a main elongate body part, generally indicated by the reference number 1, including a forward cylindrical portion 1a defining a cylindrical bore, and a rear end portion, generally indicated at 4, arranged as or provided with an appropriate handle or hand grip. The illustrated form shows a reduced diameter cylindrical hand grip part, but it will be appreciated that for some arrangements it may be preferable that the hand grip part is formed, such as for a pistol gun hand grip or butt. In either case, the handle or hand grip part is closely associated with the trigger mechanism 9.

The apparatus or tool, being power operated, is required to be of strong construction and whilst desirably as light as possible for convenience of carrying, it is of course desirable that the apparatus should have sufficient weight to absorb the recoil effect on actuation of the cutting blade as herein described in striking and cutting through branches or vines and the like. The body 1 may thus be made of steel, brass, aluminium alloys or other suitable metals, or a combination of metals and rigid plastics or other suitable materials; and thus the forward part 1a of the body 1 is of cylindrical tube form defining a cylindrical bore reciprocally housing a piston member 3 preferably incorporating at least one fluid tight piston seal 3b, e.g., an O-ring of suitable resilient material, located in an appropriate annular grove of the piston member 3, with a sealed pressure of explosion chamber 2 formed between the piston 3 and the inner closed end of the cylindrical body part 1a.

In this pruning tool form of the invention, the forward end of the cylindrical body part 1a is formed as or provided with a support and guide 17 for an elongate flat cutting blade member 18 having an inner end part 18a secured to a mounting 3a on the outer or forward side of the piston member 3. Blade member 18 extends coaxially from piston member 3 and by virtue of its connection therewith is mounted for reciprocal movement with the piston member. The outer end part 18b of the cutting blade 18 is provided with a leading cutting edge 18b. The support and guide arrangement 17 may include a pair of guide plate parts 17a, 17b secured together in closely spaced relationship permitting sliding movement of the blade member therebetween and shaped so that the blade cutting edge 18b' is not exposed when in the innermost position. The guide and support 17 may further be shaped so as to facilitate location over such as a branch or vine, and additionally the outer end part 17c thereof can be arranged as a hook, anvil or stationary cutter part against or in association with which the cutting blade 18 can act when shot forwardly by the piston 3 as a result of rapid expansion of fluid within the pressure chamber 2.

In the preferred forms of the invention, the tool is actuated by the explosion of a gas or gases admitted to the pressure or explosion chamber 2 and ignited therein. In addition, the preferred forms of the invention envisage the utilization of cartridges or cylinders or like containers of compressed natural gas, butane, liquid petroleum gas and the like, and which may be either carried by the tool or preferably readily and conveniently separately carried by a user. Preferred aspects of the invention and constructions as described herein envisage the employment of readily commercially available and disposable (when empty) cans or containers of butane gaseous fuel such as the small 8 oz. (220 grams) cans and from which it has been estimated that between 30,000 and 40,000 cutting actions may be obtainable.

The rear end part 4 of the body 1 can (although not necessarily) be shaped to define a handle or hand grip part of the tool, and may thus be of reduced diameter and cylindrical in form as illustrated in the examples, or such body rear end part 4 can be shaped or otherwise arranged for fitment to such as a pistol type gun butt or other hand grip arrangement. The prime purpose of the body rear end part 4, however, is to define the desired shape of the explosion or combustion chamber end part remote from the piston 3 and to house the valving arrangement for the device or tool. Accordingly, the body rear end part 4 has a forward section 4a which may be detachably engageable with the cylinder part 1a of the body reciprocally housing the piston 3, and such forward section 4a of the rear body part may have an inner frusto-conical form extending from the cylinder wall towards a single coaxial port 5 defining or provided with a valve seat and closable by the mushroom head 6a of a single reciprocal poppet valve 6 located coaxially of the body rear part 4 and cylinder 1a.

As best shown in FIGS. 7-12, port 5 communicates with a manifold chamber 7 which is divided by a specially shaped forward end part 6b of the valve member 6 behind the mushroom head 6a so that one side part 7a of the chamber 7 is arranged to receive fresh gaseous or vaporized fuel for admission to the explosion chamber 2, and the other side part 7b of the chamber is arranged to receive spent gases from the explosion chamber 2 and allow them to be expelled through communicating exhaust apertures or ducts 8. The head 6a of the poppet valve 6 is of typical frusto-conical form and at the gas inlet side of the junction 6b' of the valve forward part 6b with the mushroom head 6a is rounded so that when the valve member 6 is moved forwardly into the cylinder to open the port 5, the gaseous or vaporized fuel is directed around the inlet side of the explosion chamber 2 in the general direction of arrows A to sweep previously burnt gases in the explosion chamber 2 out through the port 5 to the opposite exhaust side 7b of the secondary chamber 7 and out through the communicating outlet ports or ducts 8.

For the hand impact or percussion tool to which the invention is particularly applied, as shown, operation of the valve member 6 to the open position can be directly effected by a finger trigger, such as a pivoted trigger member 9 having an inner end part 9a pivotally located in a recess 6b'' in the forward part 6b of the valve 6 behind the head 6a and on the exhaust side thereof. Rearward movement of the outer part 9b of the pivoted trigger member 9 will cause forward opening movement of the valve member 6 against the bias of a return spring 10 located about the stem 6c of the valve and within the body rear part 4. The medial part 6c' of the valve stem 6c is slidably located and sealed within a medial cylindrical bore and valve guide portion 4b of the rear body part 4. Return spring 10 is a compression spring located about the rear or outer end portion of the valve stem 6c between a forward abutment of the body at the valve guide portion 4b and a rear abutment, such as a collar 6d on the rear end part of the valve stem 6c. The area or recess 11 in which the compression spring 10 and rear end part of the valve stem 6c are located may also define a first inlet chamber 11 for the fresh unburnt gaseous or vaporized fuel associated with an inlet connection 12 for the fuel, and further communicating by way of an adjustable bleed valve arrangement with the first mentioned inlet fuel chamber 7a.

The arrangement illustrated and being described is particularly suited to the employment of a gaseous fuel such as a compressed natural gas, a liquid petroleum gas, a butane or the like and which may be readily available and supplied from portable cylinders or containers readily carried by an operator of the hand tool. The gas feed arrangement may include a fine bore jet 14a (the bore 14a' being chosen to suit the fuel and pressure applicable) communicating with a feed bore 14 communicating with the primary inlet chamber 11 and associated with an adjusting screw 15 for fine adjustment of the gas supply.

The present invention may dispense with the conventional spark plug arrangement employed for explosion engines, as the employment of gases as indicated will provide an explosion sufficient to move the piston 3 and operate the tool but which is not excessively high. An ignition may be provided in the present invention by way of an insulated electrode 13 extending through the rear body part 4 and having an inner end portion 13a turned towards and gapped from a convenient inner surface part of the body 1 defining the explosion or combustion chamber 2. The outer end portion of the electrode 13 is connected by any suitable means to a convenient and typical capacitor ignition system (not shown) synchronized to provide the electric charge to the electrode 13 when the poppet valve 6 is closed after a charge of fresh gas has been admitted to explosion chamber 2. With the relatively low temperatures applicable and the employment of gas as indicated, there will normally be little or no burning away of the electrode 13 and no damage by burning of the inner surface of the body 1 defining the explosion chamber 2. Triggering of the ignition system can be by any suitable means, and may, for example, be actuable by the trigger member 9 associated with appropriate switch or contact means. One example illustrated provides a contact pin 16 extending longitudinally and slidable within a bore of the body rear part 4 to have an inner end 16a arranged to be contacted by the rear or inner end of the valve forward part 6b on return of the valve to the closed position. The rear outer end part 16b provides or is associated with an electrical contact or switch (not shown) for the ignition system. An alternative arrangement envisages the employment of a micro-switch actuated either directly or indirectly by the trigger member 9 so as to switch on with initial movement of the trigger member to supply power to the capacitor of the ignition system and to switch again on release of the trigger member 9 and closure of the valve member 6 to discharge to the electrode 13 (or spark plug if alternatively provided).

As a fuel/air mixture is generally necessary for the operation of an internal combustion system, this can be admitted by way of one or more further ducts 8a in the rear body part 4 opening to atmosphere and communicating with the manifold inlet chamber 7a at a point or points near the gas inlet jet 14a so that air may be induced into and through the inlet chamber 7a by a venturi action on gas under pressure being passed through the jet 14a. With the provision of open ducts 8a to the inlet chamber 7a, gas supply to the jet 14a and chamber 7a must be sealed off between operations and in one arrangement (as illustrated) longitudinal recess 14' defining a supplementary part of the gas inlet or feed bore or duct(s) 14 is provided on the valve stem 6c and opening to the first inlet chamber 11 but sealed from the main feed duct(s) 14, such as by an O-ring seal 6c''' in an annular groove of the valve stem 6c, whilst the valve member 6 is in the closed position; and such recess 14' being arranged to provide the required communication for gas passage between the first inlet chamber 11 and the main feed bore or duct(s) on opening of the valve member 6.

The exhaust ducts 8 may not cope fully with all spent gases from a combustion cycle, and additionally it is desirable that the hottest gases be removed from the combustion chamber 2 before admission of the fresh charge of the fuel/air mixture to the chamber 2. Accordingly, a part of the cylinder 1a to the forward or outer side of the piston 3 is provided with a plurality of further exhaust ducts or ports 21 which are opened to the combustion chamber 2 on the piston 3 traveling past towards the end of its operating stroke following combustion or explosion of the fuel/air mixture and expansion of the combustion gases. Thus, as the piston 3 reaches the end of its active stroke, the hottest gases under pressure will escape through the exhaust ports 21 leaving exhaust ducts 8 to cope with the residue to be scoured out by a subsequent incoming charge. With the employment of gaseous fuel (as indicated) relatively low temperatures are involved, and following the escape of the hottest gases through ports 21 the residue of spent gases cool quickly after a performance of the explosion and actuating cycle, so that on the return of the piston 3 past the ports 21 and toward its original position the combustion or explosion chamber 2 is again sealed from atmosphere so that the contracting and cooling gases create a negative pressure in the combustion chamber 2 and the piston 3 and attached cutting blade 18 are thus withdrawn and held in the "home" position ready for the next operation. Inward movement of the piston 3 and attached cutting member 18 can be controlled by any suitable means or stop means, and in one arrangement illustrated in FIG. 6 a coaxial screw-threaded stop member 22 (permitting adjustment) extends from a connection with the piston 3 coaxially into the explosion chamber 2 to have its inner end 22a contact the inner face 6a' of the valve head 6 on return of the piston 3 to its first or "home" position.

Ignition of the gases in the explosion chamber can be by way of any suitable and known ignition system, and can employ a conventional spark plug arrangement. However, in one preferred aspect of the invention and as high temperatures are not involved, a simple ignition spark system in the present invention involves an elongate electrode rod 13 extending through an insulated passage in the body rear part 4 to have an inner end portion 13a turned towards and gapped from an inner side wall part of the body 1 at the explosion chamber 2, and to have an outer end part 13b connected by any suitable means to such as a conventional small capacitor ignition system. Triggering of the ignition system for synchronization of the spark with closure of the valve member 6 can also be by any suitable means, and one arrangement envisages the employment of a contact pin or rod 16 slidable located in a bore in the rear body part 4 disposed parallel with the valve stem 6c and having an inner end portion 16a arranged to be contacted by the valve forward part 6b on closure of the valve 6, the outer end part 16b of such pin 16 being connected to or arranged to act as or operate an electrical contact or switch means for the ignition system so that sparking is effected automatically on return of the valve member 6 to its closed position following release of the trigger member 9.

Actuation of the tool and valve 6 can be effected by a trigger member 9 having a portion passing through a rear body part and pivotally connected thereto for movement in a plane parallel with the valve 6 movement; the trigger member 9 in this arrangement passing through an aperture 4c adjacent to the exhaust side 7b of the manifold chamber 7 to have an inner part extending through the exhaust side 7b with an inner end 9a pivotally located in an appropriately formed recess 6b" in the valve forward part 6b; the arrangement thus providing that rearward movement of an outer part 9b of the trigger member 9 by an operator's finger will move the inner end part 6b forwardly and lift the valve member 6 of its seat against the spring bias, so that gases can be admitted from the inner side 7a of the manifold chamber 7 to the combustion chamber 2, sweeping round in the direction of arrows A, to scour the explosion chamber 2 of the residue of previously spent gases from the preceding ignition cycle. The operator is only required to press the trigger and release immediately for each cutting operation, as this will in most instances be sufficient to allow the new gas charge entry and spent gas discharge or exhaust; at the time of admission of the fuel to the explosion chamber 2 by manipulation of the trigger member 9, the piston 3 is at its innermost position, and the cutting blade 18 similarly in the innermost "home" position, so that on return of the trigger member 9 to its original position allowing return of the valve member 6 to the closed position the contained gaseous fuel in the explosion chamber 2 can be ignited and the consquential explosion will thrust the piston 3 and connected cutting blade 18 forwardly to perform the required cutting operation.

Referring now to FIG. 13 of the accompanying drawings, an alternative arrangement of a pruning tool is shown with a pistol butt type of hand grip 4". The tool is, apart from appearance, substantially similar in construction and operation to the tool previously described with reference to FIGS. 1 to 7 inclusive and like parts have the same or equivalent reference numerals. Some variations include the forming (such as by casting or molding) of a unitary forward end body part 1a for convenient screw-threaded attachment to or disengagement from (for servicing etc.) a unitary body rear end part 4', with an inner stop member 23 in the form of an annulus secured at the junction between the parts 1' and 4' to limit inward or return movement of the piston 3.

The return valve compression spring 10 of the previously described construction can be dispensed with (or a considerably weaker strength spring employed if considered desirable) by providing the rear end part of the valve stem 6c with a small piston 6d' slidably and sealably located in the first gas inlet chamber 11 which is thus of cylindrical form) so that gas under pressure admitted to the chamber 11 by way of gas inlet connection 12 and a communicating bore 11a will urge the valve member 6 rearwardly and retain it in the closed position whilst the combustion or explosion chamber 2 that is sealed from atmosphere is sealed from air inlet duct(s) 8a' and exhaust ducts 8' and 21.

The pistol butt hand grip 4" may be hollow to provide a convenient location for the gas inlet connection 12 and also for a micro-switch arrangement for triggering the ignition system for the tool. The ignition system basic components, such as electric battery, condenser and capacitor, etc., may, with the gas supply cartridge or cylinder, be conveniently provided in or arranged as a small pack carried, for example, on the operator's belt so that the tool itself is maintained light in weight for convenience in use.

The ignition arrangement may include a three way micro-switch 24 providing that it is switched on by squeezing pressure applied to the trigger outer part 9b (lifting valve member 6) to supply electric current to the capacitor system, and to switch again on release of the trigger pressure and closure of the valve member 6, and effect discharge of the capacitor charge to the spark providing means for combustion of the gas charge held in the combustion or explosion chamber 2. As before, the ignition spark can be provided by way of a small separately formed sparking plug or an inbuilt sparking electrode similar to the electrode 13 of the first described tool. Actuation of the micro-switch can be by way of an actuating spring arm 24a extending inwardly of the hand grip 4″ to have an inner end part in contact with or arranged to be contacted by an adjustable projection 25 (e.g. a screw threaded pin) extending inwardly from the trigger member outer part 9b. The spring arm 24a and screw adjustable projection 25 provide adjustment of the switch actuation and spark firing time as required, and also guard against damage to the switch 24 or any excess finger pressure on the trigger 9.

Referring now to FIGS. 14 and 15 of the drawings, there is provided a cutting or pruning tool having its forward body parts, operative piston and cutting parts substantially similar to the arrangement described with reference to FIG. 13 (like parts having like reference numerals), with a pistol handgrip 4‴, but this construction employs a preferred reliable and inexpensive piezoelectric crystal spark generating means for supplying the spark voltage to the electrode 13 of the fuel ignition system, and further improvements. In this construction the poppet valve assembly 6 is similarly located in a rearwardly extending portion of the rear body part 4′ but in this case is modified so as to be normally biased rearwardly and to the closed position by a compression spring 106 located about the poppet valve stem rear end part 6c′ and between an end stop or collar and an inner abutment of the body or stop washer associated therewith. The rear end of the valve stem and end stop located thereon locate within a recess of an actuating member or striker assembly 108 which is slidably located within a further cylindrical bore extension disposed co-axially and rearwardly of the poppet valve assembly 6 and associated body part 4′, a piezoelectric crystal assembly 138 being housed in the rear part of said extension 88 and retained in position by such as a screw threaded closure cap 140 such that a percussion cap or projection 138a of the piezoelectric crystal assembly is aligned with and capable of being struck by the striker projection 108a of the striker assembly 108. The striker assembly 108 is normally biased rearwardly towards engagement with the piezoelectric crystal assembly by means of a further compression spring 110 located co-axially about the valve compression spring 106 and between the striker assembly 108.

The prescribed quantity of gas fuel for each explosive cycle is provided in this instance by locating a cylindrical medial portion 6c′ of the valve stem is slidable engagement within a co-axially cylindrical bore of the body part 4′; the medial portion being placed in sealing engagement with its bore by a pair of spaced O-rings 6c‴ and the medial portion 6c′ being of reduced diameter between said O-rings 6c‴ to form an annular chamber 14$^x$ communicating with the source of gas fuel supply and thus capable of receiving a predetermined quantity of the gas under pressure. On actuation of the trigger mechanism 9′ to move the poppet valve assembly 6 to the open condition, the gas receiving chamber 14$^x$ cuts off its communication with the gas supply source and moves into communication with the bleed duct 14″ leading to the jetting nozzle 14a for gas fuel and air mixture delivery to the combustion chamber 12 as before.

The trigger mechanism 9′ in this preferred construction includes a trigger member 9b′ slidably movably rearwardly within a hollow guide part 4$^x$ of the piston portion 4‴ of the body by a simple single finger squeezing action, the trigger member 9b′ may be retained in position and its travel limited such as by a transverse retaining pin 4$^y$ located in the guide part 4$^x$ and in or through a slot 9b″ of the trigger member 9b′. The trigger member 9b′ is arranged to bear against or be pivotally connected to the lower end part of a trigger link 9c′ arranged for pivotal movement in a vertical longitudinal plane about a medial transverse pivot axis 9c″, and having its upper end part pivotally connected to an elongate pawl member 9d′ extending longitudinally of the tool within the upper part of the pistol grip portion 4‴ and below the body rear end part and extension 88 housing the poppet valve assembly. Such pawl member 9d′ has an upwardly hooked rear end part 9d″ arranged to project upwardly and rearwardly through an elongate slot 88a provided in the base of the extension 88 for engagement with the rear end of the striker assembly 108 so as to be capable, on initial squeezing of the trigger member 9b′ and pivoting of link 9c′ to draw the pawl member forward, of moving the striker assembly 108 against its spring bias forwardly away from the piezoelectric crystal assembly and simultaneously to move the poppet valve assembly 6 forward to the open condition against the bias of both springs 106 and 110 for admission of the gas and air charge to the combustion chamber 2. The pawl member 9d′ is normally biased into engagement with the striker assembly 108 such as by means of a torsion spring 9d‴, and the arrangement is such that when the poppet valve assembly 6 has been moved to the open condition and held in this condition for sufficient time to allow transfer of the fuel charge to the combustion chamber 2 the continued trigger squeezing causes the upper side of the pawl rear end part 9d″ to engage the forward end of slot 88a to move such pawl rear end part 9d″ downwardly out of engagement with the striker assembly 108 to allow the poppet valve assembly 6 to return to the closed condition and the striker assembly to simultaneously return under the influence of spring 110 and carry on to enable its projection or hammer 108a to strike the projection or percussion cap of the piezoelectric crystal assembly to permit the spark voltage to be transmitted via electrical connection 144 to the electrode 13 for creation of the fuel igniting spark at the electrode end 13a. Release of the trigger member 9b′ permits return of the pawl member to its original position for re-engagement of the hooked end part 9d‴ with the striker assembly 108 ready for a repeat cycle of operations.

The working concepts and operative parts of all the aforegoing constructions of cutting and pruning tools described with reference to FIGS. 1 through 15 inclusive are, particularly applicable to tools for cutting and pruning tree and bush branches, vines and other vegetation, and that sizes may be varied to suit the particular application. The same cutting and pruning tools may be usable in many instances without modification for the de-horning or horn trimming of horned animals such as cattle, deer, goats, sheep and the like. For some such operations and particularly for larger cattle, larger size tools will be desirable and to assist in retaining the horns in position during cutting the afore-described hooked anvil arrangement 17 can be replaced with a similar combination flat guide and anvil having a full circular aperture through which a horn to be cut is located.

An example of such a 'de-horning gun' is illustrated in FIGS. 17 and 18; it is not necessary to repeat and detail the principal working components as these may for example be the same as or similar to the arrangements described particularly with reference to FIGS. 13, 14, and 15, of the drawings (like parts having like reference numerals), but a larger barrel type body $1^x$ can be provided to define the combustion chamber 2 and cylindrical bore $2a$, housing the piston 3; and the cutting blade 18 connected to the piston 3 is of sufficient width to ensure that the full width of the horn receiving aperture $17^x$ is traversed. This form of the invention is of course not confined to the de-horning of animals but may be usable for the severing of other free-ended objects.

The aforegoing construction employs an impact drive member in the form of a rigid blade, but other applications of the invention envisaged the employment of the force exertable by the working piston 3 to expel a charge of fluid e.g. air, from the outer end part of the bore $2a$ housing the piston for the performance of other operations. One such application, and as illustrated by way of example in FIG. 19 of the drawings, envisages simply dispensing with the cutting blade 18 and mounting $3a$ therefore on the piston 3, and the substitution for the forward end guide and anvil assembly 17 of an outer end wall part $26a$ mounting an elongate tubular barrel $2b$ which is arranged to receive a projectile required to be shot, the inner end of the barrel being in communication with the outer end part of the cylindrical bore defined by the body 1 so that on the power stroke of the piston 3 an object placed in the barrel 26 can be shot from the barrel by the rapid air pressure — it is envisaged that this form of tool may be usefully employed in surf-casting operations for projecting the weighted end of a fishing line out to see (the fishing line weight being the projectile).

In another application, it is envisaged that the barrel 26 or a tubular member of a similar nature can be employed for ground aeration in agricultural operations. In orchards for example and particularly where the ground around the trees is subject to heavy traffic from orchard vehicles, the ground gradually becomes compacted and loosening by ploughing or tilling is undesirable in view of possible damage to the roots of the trees. Accordingly, the present invention provides a means for shattering, loosening and aerating the soil below the ground and around such as tree roots, without damaging such roots; the barrel 26 or like member being insertable in the ground at intervals as and where required and a charge of air blasted into the ground. Referring now to FIG. 20 of the drawings, in a variation of the simpler arrangement according to FIG. 19 the outer end of the cylindrical bore $2a$ of the body 1 is arranged to communicate with a secondary cylindrical bore chamber housing a supplementary piston $3^x$ for delivering the required charge of air from the secondary chamber 27 out through a communicating barrel or like tubular member 26'. In the preferred illustrated arrangement the secondary chamber 27 is defined by a cylindrical co-axial extension $27a$ of the outer or nose end of the body 1 and the supplementary piston $3^x$ is directly coupled to the main working or drive piston 3 such as by a rigid tube co-axial connector $3^y$. Preferably the chamber 27 and piston $3^x$ are of smaller diameter than the chamber or bore $2a$ and piston 3, and the bore of the barrel 26' is relatively small so that air pressure is elevated and delivered at high velocity. A supplementary resilient buffer $19a$ similar to buffer 19 can be provided in the outer end part of the secondary chamber 27 adjacent the outer end wall. Because of the rapid return of the pistons 3 and $3^x$ after performance of the work stroke and so that such return is not inhibited due to the small bore of the barrel 26' and any possible blockage, air is arranged to be admitted to the secondary chamber by way of a plurality of inlet ducts $27b$ in the wall parts $27a$ thereof and towards the inner end, and one or more apertures $27c$ are provided in the tubular connector $3^y$ and communicating with a co-axial duct $27d$ through the supplementary piston $3^x$.

In addition to the aforementioned application for firing projectiles and aerating soil etc., it is envisaged that the charge of air under pressure may, as an alternative to a captive bolt actuated tool for killing or stunning animals (the captive bolt being the impact drive member in other forms of the invention), be delivered with sufficient force to provide a more humane and efficient method of stunning animals prior to slaughter.

The power tool is not confined to the delivery only of a charge of air admitted under atmospheric pressure but can be similarly applicable to the high velocity delivery of a charge of liquid, particularly in small metered dosages with an associated metering device, such as a treatment liquid for animals and such as trees, e.g. in forestry and orchardist applications a prescribed dosage of a treatment liquid can be quickly and readily fired under pressure to the heart area of a tree trunk without the need to pre-drill a hole for the liquid.

Referring now to FIG. 21 of the drawings, another application of the invention envisaged is in such as veterinary work where animals can be marked or treated from a distance by the firing of capsules containing a marking and/or treatment liquid. In such applications the capsule to be fired must be strong enough to withstand firing and flight air pressures, but must readily discharge its content on the target animal without penetration of the animals hide. Accordingly, in one aspect each capsule is of a thin relatively strong but easily severable material e.g. a suitable plastics material, and is arranged to be shot (as before mentioned with respect to projectiles) from a barrel 26" having its inner end in communication with the tool cylindrical bore $2a$ outer end part (or a secondary chamber 27 outer end part in reference to the construction according to FIG. 20), and the outer end part of the barrel 26" is provided with at least one but preferably two or more sharp projections $26a''$ arranged to slit wall parts of the capsule (without complete severing into pieces) as it leaves the barrel 26", so that more complete splitting of the capsule for emission of its liquid content takes place on the target animal being hit, and without harming such animal. Preferably the arrangement provides for repetitive operations and accordingly a supply of the capsules can be provided in a container or magazine 29 associated with a breech loading means. In the illustrated form of FIG. 21 a simple breech loading means may involve a cylindrical tubular bolt member $29a$ slidably located as a close fit within the rear or inner end part of the barrel 26" so as to normally locate over and seal off a breech opening $29b$ through which individual capsules 28 can be passed into the barrel 26". The bolt member $29a$ is normally urged forwardly to this closing off position such as by a tension spring $29c$ extending between an external anchor point $29d$ and a finger operated trigger or release member $29e$ projecting laterally of the tubular bolt member 29 through an appropriate slot 29f in the barrel inner end part, and is movable rearwardly to open the breech opening and permit a fresh capsule to pass into the barrel by moving the trigger or release member 29e rearwardly against the influence of spring 29c. The inner end part of the tubular bolt member 29 (through which the air under pressure can pass) may be provided with an annular flange 29g arranged to mate with and abut the inner end face of a mounting part 29h for the magazine or container 29 and barrel 26a'', and an appropriate closure cap 29j is provided for such magazine or container 29.

Referring now more particularly to FIGS. 22 to 25, there is shown therein a portable fastener driving tool, generally indicated at 30, which is constructed in accordance with the principles of the present invention. The tool 30 closely follows the operating principles embodied in the pruning tools previously described except that the combustion chamber is provided in surrounding relation to the cylindrical chamber within which the piston reciprocates, and a delaying mechanism is provided for delaying the communication of the combustion chamber with the piston after ignition has occurred so that the pressure has a chance to build up before being fully communicated with the piston to drive the same. The tool 30 also includes an improved trigger actuating mechanism and is provided with the additional components conventional with fastener driving devices, including a fastener handling assembly for containing a package of fasteners and feeding them to a drive track so to be driven therefrom by a fastener driving element into a work piece.

With the above in mind, the apparatus 30 includes a housing assembly, generally indicated at 32, providing a cylinder 34 defining an interior cylindrical chamber 36 within which a piston 38 is mounted. Piston 38 includes a pair of axially spaced piston ring seals which serve to permit the piston 38 to slide with respect to the cylinder in sealing relation to the interior thereof between a first position, as shown in FIG. 24, downwardly through a driving stroke into a second position and upwardly from the second position into the first position through a return stroke.

Fixed to the central portion of the piston 38 is one end of a fastener driving element 42 which extends downwardly therefrom into a drive track 44 provided in a nose piece structure 46 forming a part of the housing assembly 32. The nose piece structure 46 is fixedly secured to the lower end of the cylinder 34 by a plurality of elongated bolts 48. These bolts 48 extend upwardly through the corners of a square flange 50 formed on the upper end of the nose piece structure 46. The upper ends of the bolts 48 are threadedly engaged within an annular wall 52 forming a part of the housing structure 32. Wall 52 is apertured, as at 54, to receive the cylinder 34 therein, the opening 54 being grooved to receive an O-ring seal 56. Extending upwardly from the periphery of the wall 52 in spaced relation to the upper end portion of the cylinder 34 is a peripheral wall 58. The upper end portion of the peripheral wall 58 is interiorly threaded to receive the lower exteriorly threaded end of a cap member 60. Cap member 60 includes an annular recess 62 in the lower surface thereof for receiving the upper end portion of the cylinder member 34. The interior surfaces of the cap member 60, peripheral wall 58 and annular wall 52 define with the coextensive exterior surface of the cylinder 34, an annular combustion chamber 64 which surrounds the upper end portion of the cylindrical chamber 36.

Mounted within the interior of the cylinder 36 within the recess 62 is a ring-shaped bumper 66 which engages the upper surface of the piston and determines the upper limiting position of the same, as shown in FIG. 24. Combustion chamber 64 is operatively associated with the upper end of the cylindrical chamber 36 through a bleed passage 68 in series with a check valve assembly 70. As shown, bleed passage 68 is formed in the cap member 60 and has one end communicating with the interior of the bumper ring 66 and the opposite end thereof communicating with one side of the check valve assembly 70 the opposite side of which is communicated with the combustion chamber 64. In addition, a series of openings 72 are formed in the cylinder 34 so as to communicate the combustion chamber 64 with the cylindrical chamber 36 at a level disposed between the piston seals 40 when the piston 38 is in its upper limiting position engaged with the bumper ring 60. A bleed adjustment screw can replace the check valve 70.

The peripheral wall 58 is formed with a rearwardly extending annular boss 74. Extending through the peripheral wall 58 and the boss 74 is an interiorly threaded opening 76 for detachably sealingly receiving an exteriorly threaded forward end of a hollow handle member 78, forming a part of the housing assembly 32. The interior forward end of the hollow handle member 78 provides opening means leading into and out of the combustion chamber 64 which is defined by an annular frusto-conical valve seat 80. Mounted within the hollow handle member 78 is a poppet valve assembly, generally indicated at 82. The poppet valve assembly 82 has a frusto-conical valve element 84 formed on the forward end thereof which is shaped to engage the seat 80 in a closed condition with respect thereto. Detachably fixed, as by bolts 86 or the like, to the rearward end of the hollow handle member 78, is a tubular extension 88 which also forms a part of the housing assembly 32. Tubular extension 88 is formed with an axial bore 90 in its forward end which slidably receives an intermediate stem portion 92 of the poppet valve assembly 82 therein. The intermediate stem portion 92 is formed with a pair of axially spaced annular grooves 94 which receive therein a pair of O-ring seals 96. The section of the stem portion 92 between the seals is of reduced diameter so as to provide an annular flow space within the bore 90 for a purpose hereinafter to be more fully explained.

Extending rearwardly from the intermediate stem portion 92 is a rearward end portion 98 of reduced diameter having its rearward extremity suitably exteriorly threaded to receive an enlarged knob 100 thereon. The rearward portion of tubular extension 88 is formed with a counter bore 102 which defines with the bore 90 a rearwardly facing annular shoulder for receiving a washer 104. A coil spring 106 is disposed in surrounding relation with the rear stem portion 98 and has its ends engaged with the washer 104 and the enlarged knob 100 so as to resiliently bias the poppet valve assembly 82 rearwardly into a limiting position wherein the valve element 84 is in a closed condition with respect to the opening defined by the seat 80.

The rearward end of the knob 110 is adapted to be engaged by an actuating member 108 which is biased into a rearward limiting position by a coil spring 110 disposed in surrounding relation to the coil spring 106 with one end in engagement with the washer 104 and the opposite end thereof engaged with an interior shoulder formed in the actuating member 108. The periphery of the actuating member 108 is of cylindrical shape and of a size to slidably engage within the counter bore 102 of the tubular extension 88 so as to enable the actuating member 108 to be moved from its rearward limiting position, as shown in FIG. 14, into a forward operating position, as shown in FIG. 15. This movement is accomplished by means of a manually actuated trigger assembly, generally indicated at 112.

As shown, the trigger assembly 112 includes a pair of arms 114 pivoted at one of their ends, as by pivot pins 116, to opposite sides of an enlarged rear end portion of the hollow handle member 78. As shown, pivot pins 116 are concentric and the arms 114 extend downwardly therefrom and are rigidly interconnected, as by welding or the like, to the rear end of a trigger member 118 which extends forwardly into a convenient position to be digitally operated by a user grasping the handle member 78. The arms 114 extend downwardly below their fixed connection with the rear end of the trigger 118 so as to receive there between the forward end of a pawl member 120. As shown, the forward end of the pawl member 120 is pivoted between the arms 114 by a pair of pivot pins 122. A compression coil spring 124 is mounted between a forward extension of the pawl member 120 and the trigger 118 so as to resiliently bias the pawl member 120 to move about the common axis of the pivot pins 122 in a counter-clockwise direction as viewed in FIG. 24. The arms 114 and trigger 118 are biased to move in a counter-clockwise direction as viewed in FIG. 24 into a rearward limiting position by a tension coil spring 126 extending between the forward end of the pawl member 120 and a fastener 128 suitably fixed to the rearward end portion of the tubular extension 88.

The pawl member 120 includes a hook-shaped rearward end 130 which extends through an appropriate slot 132 in the tubular extension 88 for releasable engagement with a shallow frusto-conical surface 134 formed on the rear end of the actuating member 108 adjacent its periphery. Formed in the central portion of the rearward surface of the actuating member 108 is a projection 136 for engaging the plunger of a conventional piezoelectric crystal assembly 138. As shown, the piezoelectric crystal assembly 138 is retained within the rear end of the counter bore 102 by a removable cap element 140. The piezoelectric crystal assembly 138 includes an output lead which is connected, as by a wire lead 142, to a spark plug 144 mounted within the wall 52 so that its spark contacts extend into the combustion chamber 64.

Referring now more particularly to FIG. 25, formed in the tubular extension 88 is a combustible gas inlet passage 146 which is adapted to be connected with a source of combustible gas under pressure. As before, the source of combustible gas under pressure may constitute a container of butane under pressure which is adapted to be handled separately from the tool 30. The container contains an outlet line 148 leading to the inlet passage 146. The inner end of the inlet passage 146 extends into bore 90 at a position which is disposed between the O-ring seals 96 when the poppet valve assembly 82 is in its closed position. Communicating with the bore at a position forwardly of the forward-most O-ring seal is a passage 150 which leads to an axially extending outlet nozzle 152 suitably mounted in the forward end portion of the tubular extension 88 in radially offset relation with respect to the bore 90.

Formed in the rearward enlarged portion of the handle member 78 is a fresh air inlet passage 154 which communicates with the interior of the handle member 78 at a position just forwardly of the combustible gas outlet nozzle 152. It will be noted that the poppet valve assembly 82 includes a main valve stem portion 156 having a semicircular shaped land portion 158 at the rearward juncture thereof with the intermediate stem portion 92 and a forward semi-circular land portion 160 spaced rearwardly from the forward poppet valve element 84. Formed in the forward portion of the handle member 78 at a position forwardly of the forward land portion 186 is an exhaust vent passageway 162.

It can be seen from FIG. 25 that when the poppet valve assembly 82 is in its opened condition, combustible gas from the passage 146 can flow through the annular passage between the O-ring seals 96 into passage 150 and outwardly through the outlet nozzle 152 which extends toward one side of the opening defined by valve seat 80. As the combustible gas under pressure flows past the fresh air inlet 154, a flow of fresh air is induced through the passage 154 which enters the interior of the handle member 78 and mixes with the flow of combustible gas. The combustible gas mixture passes through one side of the opening 80 and into the combustion chamber 64. The effect of the flow of combustible gas mixture into the combustion chamber 86 is to cause sufficient residual gas within the combustion chamber to be moved thereby outwardly of the opposite side of the opening defined by the valve seat 80. The residual gas passing from the combustion chamber through the opposite side of the valve seat opening 80 is directed by the land portion 160 to flow outwardly through the exhaust vent passage 162. It can thus be seen that the effect of opening the poppet valve assembly 82 is to create the aforesaid flow which is represented by the arrows in FIG. 25, the result of which is to establish within the combustion chamber 54 a gas charge which is capable of being ignited and burned after closure of valve 82.

Ignition occurs after the poppet valve assembly 82 has been returned into its closed condition. As the burning proceeds, the pressure within the combustion chamber increases and the initial effect of the pressure increase is to establish a flow of high pressure gas past the check valve 70 (or bleed adjustment screw) and into the bleed passage 68.

The bleed passage 68 is calibrated to provide a pressure build up within the upper end of the cylindrical chamber 36 sufficient to commence the movement of the piston 38 downwardly to an extent sufficient to uncover the openings 72 within a time period enabling the pressure within the combustion chamber to reach substantially an optimum maximum value so that when the piston uncovers the openings 72, this optimum high pressure is immediately imposed upon the piston 38 to effect the major portion of the drive stroke thereof.

Mounted within the lower end of the cylinder 34 is a resilient bumper 164 which is engaged by the piston when it reaches the end of its drive stroke. At this position the upper peripheral seal 40 is disposed below a series of exhaust openings 166 formed in the cylinder 34. Consequently, at the end of the drive stroke the pressure above the piston is rapidly dumped into the atmosphere through exhaust openings 166. Resilient bumper 164 is depressed and causes the piston 38 to rebound upwardly to a position above the openings 166. The residual gas within the cylindrical chamber 36 and the combustion chamber 64 communicated therewith through openings 72 rapidly diminishes in temperature creating a negative pressure condition therein. The atmospheric pressure acting on the lower side of the piston due to the negative pressure conditions on the upper side moves the piston upwardly through a return stroke. The momentum of the return stroke of the piston serves to move the same past the openings 72 into the limiting position shown in FIG. 14.

It will be understood that the nose piece structure 46 of the housing 32 may be fitted with any conventional fastener handling mechanism. As shown, the nose piece structure 46 carries a fastener handling mechanism 168 which is constructed in accordance with the teachings contained in U.S. Pat. No. 3,945,551, the disclosure of which is hereby incorporated by reference into the present specification. It is believed that a detailed description of the fastener handling mechanism is not necessary to an understanding of its operation with respect to the remaining components of the present invention. Suffice it to say that the fastener handling mechanism 168 is of the type to receive a coiled package of common nail fasteners interconnected by a pair of wires welded across the shanks thereof in an array in which adjacent nails are in parallel relation with respect to one another. The fastener handling mechanism 168 not only contains the fastener package but serves to engage a leading portion of the fastener package and to feed the leading fastener of the leading portion into the drive track 46 during the return stroke of the fastener driving element 42 with the piston 38 so that a fastener will be presented within the drive track 44 to be engaged by the fastener driving element 42 and driven outwardly of the drive track into a work piece by the fastener driving element during the drive stroke thereof.

The feeding means of the fastener handling mechanism 168 is actuated by gas under pressure and this gas comes from the cylindrical chamber 36 during the drive stroke of the piston in accordance with the teachings of the aforesaid patent. As shown, an opening 170 is formed in the cylinder 34 at a position above the openings 166. The outer end of the opening 170 leads to one end of an elongated passage 172 formed in a tubular member 174. Tubular member 174 is slidably mounted in parallel relation with the cylinder 34 and has its upper end slidably engaged within a bore 176 formed in the adjacent portion of the wall 52. A coil spring 178 is mounted within the upper hollow end of the tubular member 74 and serves to resiliently bias the same downwardly. An O-ring seal 180 serves to provide a sliding seal for communicating the openings 170 with the upper end of the passage 72. The lower end of the tubular member 174 is slidably sealingly received in the nose piece structure so that the lower end of the passage 172 can be communicated with the piston and cylinder of the feed means.

To briefly review the operation of the fastener driving tool 30, the user grasps the handle portion 78 and handles the tool in portable fashion to engage the lower end of the nose piece structure 46 to a work piece to be fastened. The parts are in the position shown in FIG. 14 with a fastener in the drive track 44 below the lower end of the fastener driving device 42. To commence operation the user simply applies a digital squeeze to the trigger 118 which has the effect of pivoting the arms 114 connected therewith forwardly in a clockwise direction as viewed in FIG. 24 about the axis of the pivot pins 116. This movement causes the hooked end 130 of the pawl member 120 to move the actuating member 108 forwardly. During this forward movement, the rear end 100 of the poppet valve assembly 82 is engaged and moved forwardly from its closed condition into the open condition shown in FIG. 25. The operator holds the trigger in this position for a period of time sufficient to enable the flow, represented by the arrows in FIG. 25 and previously described in detail, to take place which has the effect of establishing a gas charge within the combustion chamber 64 capable of being ignited and burned.

As soon as the operator is satisfied that the charge has been established, he applies further squeezing pressure to the trigger 118 which has the effect of moving the pawl member 120 forwardly a distance sufficient to move the hook end 130 out of engagement with the surface 134 of the actuating member 108. Once the actuating member 108 is released by the pawl member 120, the springs 106 and 110 bias the poppet valve assembly 82 and actuating member 108 rearwardly. In this way, the poppet valve assembly 82 is returned to its closed condition with respect to the valve seat opening 80 and the actuating member 108 is moved rearwardly to impact the piezoelectric crystal assembly 138. Thus, when the spark is created in spark plug 144, by virtue of the impact of the piezoelectric assembly 138, to ignite the gas charge in the combustion chamber 64, poppet valve element 84 will be in closing engagement with seat 80.

The burning of the gas charge within the combustion chamber 64 increases the pressure conditions therein which are communicated in delayed fashion, as aforesaid through check valve assembly 70 and bleed passage 68 to commence the downward movement of the piston. By the time that the piston has cleared openings 72, the pressure conditions within the combustion chamber are at optimum peak resulting in a rapid drive stroke of the piston. Piston carried with it the fastener driving element which, in turn, drives the fastener in the drive track 44 outwardly thereof into the work piece.

During the drive stroke of the piston, opening 170 is exposed to the driving pressure in chamber 36 as the piston passes by, thus conditioning the feed means of the fastener handling mechanism 168 to advance the leading fastener into the drive track during the return stroke of the fastener driving element. The return stroke is, as aforesaid, accomplished by exhausting the pressure acting on the piston through exhaust openings 166, causing the piston to rebound upwardly by the resilient bumper 164 and relying upon the rapid temperature drop of the residual gases in chambers 36 and 64 to establish a sufficient negative pressure condition therein to enable the atmospheric pressure acting on the underside of piston 38 to return it.

It will be understood that the structural and functional principles embodied in the fastener driving tool 30 can likewise be embodied in a pruning tool such as shown in FIGS. 1-13 or in any of the other types of tools hereinbefore mentioned.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

I claim:

1. A portable power tool comprising:
   a body;
   a bore within said body;
   a piston, slidably mounted within said bore for a movement in one direction from a first position through a power stroke into a second position and in an opposite direction through a return stroke;
   a combustion chamber formed in said body and communicating with said bore at an end remote from said second position of said piston and being arranged to receive a gaseous fuel for ignition and combustion;
   inlet means for admitting said fuel to said combustion chamber;
   outlet means for exhausting residual gases from said combustion chamber;
   valve means operable to control said admission and said exhaust through said inlet means and outlet means respectively;
   supply means for supplying said fuel to said inlet means;
   said valve means, said inlet means, said outlet means and said combustion chamber cooperating so that when said valve means allows communication between said combustion chamber and both said inlet means and said outlet means and said piston is at its first position, said fuel is directed into said combustion chamber in a manner scouring the combustion chamber of residual gases from a preceding cycle of operation of the tool and sweeps said residual gases out through said outlet means prior to the valve means adopting a condition in which said outlet means is closed;
   and ignition means for igniting said fuel in said combustion chamber;
   whereby subsequent combustion of said fuel creates an elevated pressure condition within said combustion chamber which acts on said piston to cause rapid movement under power of said piston, through said power stroke towards said second position, said piston being arranged to effect a required power assisted operation.

2. A portable power tool as claimed in claim 1 wherein the further chamber is of cylindrical form and disposed co-axially of said cylindrical bore, said further chamber being of smaller diameter than the diameter of the cylindrical bore and slidably sealingly housing a further piston coupled to said piston of the cylindrical bore for reciprocal movement therewith; the diameter differences providing, for elevation of the pressure to be exerted on the fluid to be expelled during the power stroke.

3. A portable power tool according to claim 1, wherein a manifold chamber communicates with said combustion chamber through an opening, said inlet means and said outlet means are each formed at least in part by a respective part of said manifold chamber and each communicates with said combustion chamber through said opening, and said valve means is operable to open and close said opening.

4. A portable power tool according to claim 3, wherein a valve seat surrounds said opening and said valve means is engageable with that valve seat to close both said inlet means and said outlet means.

5. A portable power tool according to claim 3, wherein said valve means extends into said manifold chamber and separates the respective said parts thereof which define said inlet means and said outlet means.

6. A portable power tool as claimed in claim 1 wherein said body defines a further chamber in communication with the outer end part of the cylindrical bore remote from the piston first position, said further chamber having inlet and outlet means and being arranged to receive a charge of fluid as the piston moves from its second position to its first position on the return stroke, the arrangement providing that said charge of fluid is capable of being rapidly expelled by movement of the piston through its power stroke to said second position.

7. A portable power tool as claimed in claim 6 wherein the fluid to be expelled is air admitted under atmospheric pressure through the inlet means, and the outlet means comprises an elongate tubular member arranged for insertion in the ground to deliver the charge of expelled air under pressure to an area below ground level to effect soil shattering and aeration for agricultural purposes.

8. A portable power tool as claimed in claim 6 wherein said outlet means comprises an elongate barrel arranged to receive a projectile capable of being ejected by said fluid expulsion.

9. A portable power tool as claimed in claim 8 wherein the fluid to be expelled is air admitted under atmospheric pressure through the inlet means, and the projectile is a capsule containing a marking and/or treatment liquid capable of being discharged onto and/or into an animal.

10. A portable power tool as claimed in claim 9 wherein said capsule is of a severable material and said barrel is provided at or near its outlet end with at least one sharp projection arranged to slit the capsule as it is expelled from the barrel to facilitate discharge of the liquid content on the capsule reaching and hitting its intended target.

11. A power tool as claimed in claim 9 or claim 10 wherein a magazine or container for a plurality of the capsules is mounted in juxtaposition with a breech loading means for successively loading individual capsule in the barrel.

12. A portable power tool as claimed in claim 1 wherein said body has an end wall part partially closing the outer end of the cylindrical bore remote from the piston first position and defining or provided with a guide through which an impact drive member is slidably located, said impact drive member being disposed longitudinally of the cylindrical bore and having an inner end part connected to the piston for reciprocal movement therewith.

13. A portable power tool as claimed in claim 12 when arranged and constructed for operation as an animal stunning or killing gun.

14. A portable power tool as claimed in claim 12 wherein said end wall part is provided with support means for a plurality of fasteners each of which is arranged for successive driven engagement with a work piece by movement of said impact drive member through its power stroke.

15. A portable power tool as claimed in claim 14 wherein said support means comprises a means successively positioning each fastener in co-axial alignment with said impact drive member so that an outer or head part of each fastener so positioned is capable of being contacted by the free end of said impact drive member on commencement of the power stroke for direct driving of the fastener into the work piece by said impact drive member as it continues through its power stroke.

16. A portable power tool as claimed in claim 15 wherein successive positioning of each fastener in alignment with the impact drive member is arranged to be effected by diversion through duct means of a proportion of the ignited fuel mixture gases under elevated pressure.

17. A portable power tool as claimed in claim 12 wherein said impact drive member is in the form of a flat elongate blade having its outer end provided with a sharpened cutting edge.

18. A portable power tool as claimed in claim 17 wherein said end wall part of the body is provided with a substantially flat hooked anvil or stationary cutter against which the outer end part of the blade can slide and with which said outer cutting edge can co-operate in severing an object located between said blade cutting edge and said hooked anvil or stationary cutter upon movement of said piston and connected blade through the power stroke.

19. A portable power tool as claimed in claim 17 wherein said end wall part of the body is provided with a stationary substantially flat anvil and holding assembly having an aperture through which an elongate free ended object can be located, the outer end part of said blade being arranged to slide against said anvil and holding assembly with the end cutting edge of the blade fully traversing the area of said opening so as to be capable of severing the object located therethrough upon movement of said piston and connected blade through the power stroke.

20. A portable power tool as claimed in claim 19 when arranged and constructed for operation as a pruning tool.

21. A portable power tool as claimed in claim 19 when arranged and constructed for operation as a dehorning gun for horned animals.

* * * * *